United States Patent [19]
Böttger et al.
[11] Patent Number: 4,647,417
[45] Date of Patent: Mar. 3, 1987

[54] PARTICLEBOARD PRESS WITH SPRING-LOADED PLATEN

[75] Inventors: Friedrich Böttger, Haan; Klaus Gerhardt, Rheurdt, both of Fed. Rep. of Germany

[73] Assignee: G. Siempelkamp GmbH & Co., Krefeld, Fed. Rep. of Germany

[21] Appl. No.: 719,759

[22] Filed: Apr. 4, 1985

[30] Foreign Application Priority Data

Apr. 10, 1984 [DE] Fed. Rep. of Germany ....... 3413397

[51] Int. Cl.⁴ ............ B29C 43/22

[52] U.S. Cl. ............ 264/120; 100/154; 156/583.5; 425/335; 425/371

[58] Field of Search ............ 100/118, 151, 154; 425/364 R, 371, 335, 364, 406, 329, 149; 156/555, 583.3, 583.5, 583.91; 264/109, 112, 120, 122, 165, 40.5, 40.7

[56] References Cited

U.S. PATENT DOCUMENTS

| | | | |
|---|---|---|---|
| 3,120,862 | 2/1964 | Burger | 100/154 |
| 3,851,685 | 12/1974 | Ahrweiler et al. | 100/154 |
| 3,973,483 | 8/1976 | Appenzeller | 100/154 |
| 4,311,550 | 1/1982 | Kerttula | 100/154 |

FOREIGN PATENT DOCUMENTS

| | | | |
|---|---|---|---|
| 2037442 | 2/1972 | Fed. Rep. of Germany | 100/154 |
| 2343427 | 3/1975 | Fed. Rep. of Germany . | |
| 3133792 | 3/1983 | Fed. Rep. of Germany . | |
| 403242 | 12/1933 | United Kingdom | 100/154 |

*Primary Examiner*—Tim Miles
*Assistant Examiner*—J. Fortenberry
*Attorney, Agent, or Firm*—Karl F. Ross; Herbert Dubno

[57] ABSTRACT

A particleboard press for converting a thick mat into a thin panel has a frame, an upper beam and a lower beam carried on the frame and vertically confronting each another, respective upper and lower platens carried on the beams and vertically confronting each other, and respective upper and lower belts having stretches engaged under and over the upper and lower platens, respectively. The belts are synchronously driven so as to advance a mat in a transport direction through the press between the platens. One of the beams is vertically displaceable on the frame relative to the other beam and its platen has relative to the direction a downstream calibration portion and an upstream compression portion at least limitedly vertically displaceable relative to the one beam and the downstream calibration portion. The calibration portion is urged into a calibration position spaced a predetermined vertical distance from the other platen and the compression portion is urged with a predetermined generally constant force toward the other platen while permitting deflection of the compression portion of the one platen away from the other platen against this constant force and without substantial change of same.

6 Claims, 3 Drawing Figures

PARTICLEBOARD PRESS WITH SPRING-LOADED PLATEN

FIELD OF THE INVENTION

The present invention relates to a particleboard press. More particularly this invention concerns a belt-type press for the continuous production of particleboard.

BACKGROUND OF THE INVENTION

Particleboard is typically made by first forming a relatively thick mat of the particles—chips or fibers mixed with a heat-activatable resin binder and possibly even rigid laminae—and then simultaneously pressing this mat workpiece while heating it to plastify the resin and reduce its thickness. During this pressing operation, the mat is subjected to a first compression-heating stage and then to a calibration-curing stage. During the first stage the simultaneous application of heat and pressure plastify the resin in the mat and compress the mat to densify it and mix the binder with the particles or fibers. In the second stage the board is merely confined between the two press surfaces which are at an exactly established spacing from each other so that as the resin cures this dimension is accurately imparted to the workpiece. Thereafter the workpiece is cut to size and, if necessary, finished.

In this type of arrangement the system is set up so that every portion of the mat is continuously subjected to compression in accordance with a so-called press curve that has been established in the industry. Since continuous, belt-type presses are relatively new, as compared to the older discontinuous-production multiplaten systems, the pressing curve that was applied via these older presses has been adapted to the newer belt-type continuous-production arrangements. Thus the pressure/time relationship of the discontinuous presses is converted into a pressure/displacement relationship, as continuous uniform displacement is a direct function of time, and the mat is subjected to the appropriate pressure levels in the appropriate regions of the press. In U.S. Pat. No. 4,468,188 of Klaus Gerhardt this distribution of pressing force is achieved by using identical hydraulic rams all pressurized from the same source, but physically distributed in accordance with the desired pressure distribution.

The mat thickness and density as well as the composition of the fibers and binder vary statistically within a certain range, so that when a fixed pressure level is used in the compression zone some portions of a given workpiece can well be subjected to excessive pressure which will damage fibers while other regions will not be compressed enough so that weak voids will be left in the finished product. As such an improperly compressed workpiece passes into the calibration zone it loses its elasticity and becomes mainly plastic, and the defects are made permanent in the product.

German Patent Document No. 2,343,427 proposes a complex control system for dealing with this problem. The calibration zone is provided with strain gauges that measure the pressure with which the mat being calibrated resists compression. A controller compares these detected reaction pressures with desired values so that, for instance, when the reaction pressure drops to indicate the board is overly compressed, it reduces pressure upstream in the actuators bearing on the workpiece in the compression zone. Such a complicated arrangement operates adequately with slowly varying workpieces, but the feedback nature of its operation creates a response time too long to compensate out localized irregularities, and in fact can damage the workpiece in response to detection of such a localized problem.

OBJECTS OF THE INVENTION

It is therefore an object of the present invention to provide an improved belt-type particleboard press.

Another object is the provision of such a belt-type particleboard press which overcomes the above-given disadvantages, that is which responds instantly and rapidly to varying mat parameters.

SUMMARY OF THE INVENTION

A particleboard press for converting a thick mat into a thin panel according to the invention has a frame, an upper beam and a lower beam carried on the frame and vertically confronting one another, respective upper and lower platens carried on the beams and vertically confronting each other, and respective upper and lower belts having stretches engaged under and over the upper and lower platens, respectively. The belts are synchronously driven so as to advance a mat in a transport direction through the press between the platens. One of the beams is vertically displaceable on the frame relative to the other beam and its platen has relative to the direction a downstream calibration portion and an upstream compression portion at least limitedly vertically displaceable relative to the one beam and the downstream calibration portion. The calibration portion according to this invention is urged into a calibration position spaced a predetermined vertical distance from the other platen and the compression portion is urged with a predetermined generally constant force toward the other platen while permitting deflection of the compression portion of the one platen away from the other platen against this constant force and without substantial change of same.

With this system, therefore, the generally constant force, which can in fact change somewhat so long as it remains within the range appropriate for compressing the workpiece, stays the same as the vertically displaceable compression portion of the movable platen is deflected up and down, imparting the same extent of compression to the workpiece regardless of localized variations. It has been found that, so long as the compression force is fairly uniform in the compression zone, even if the actual workpiece size varies, this has virtually no effect on the finished product, as size is determined in the calibration zone. There will be no regions compacted to the point of damage to the mat and no regions compacted so little that weak spots are left in the product.

According to another feature of this invention spacers are operatively engageable between the platens in the calibration zone to establish the calibration position. Thus the actuators merely hold the calibration portion down tight against the appropriate spacer stops so that the thickness of the now plastic workpiece is accurately established. The spacers can be adjusted or changed to produce panels of different thicknesses. Thus these spacers greatly simplify the system, as only enough pressure need be applied in the calibration zone to overcome the modest force with which the workpiece, which in this region is plastic, resists compression, so that complicated pressure-controlling systems become unnecessary.

Although it is possible for the one platen to be of two-part construction, for instance hinged together between the calibration and compression parts, according to a particular feature of this invention this platen is unitary in both the calibration and compression zone and is elastically deformable relative to the respective beam at least in the compression zone, it being understood that the terms "beam" and "platen" are used relatively, in this case respectively for the rigid support structure and the nonrigid belt-engaging element. Hydraulic or pneumatic biasing units may be used as well as springs operatively braced between compression portion of the one platen and the respective beam. With springs it is convenient to provide adjustable spring seats or stops for adjusting the force exerted by the springs between the compression portion of the one platen and the respective beam. In addition in such an arrangement the elasticity of the one platen itself constitutes the means urging the compression portion of the one platen toward the other platen. Thus the spring force that is applied is equal to the force desired minus the force needed to deform the platen or beam, so that if this elastically deformable element does not have a flat spring characteristic, the biasing elements must have complementary spring characteristics.

With the system of this invention the device for setting the press gap can be set at a desired level based on location in the press. It can be made dependent on pressure and compared to a desired value. Expensive control arrangements which compensate for actual-value variations of the mat within a normal range become wholly superfluous with this invention. No feedback arrangement in fact is needed and the system has a zero response time. The press gap is set purely geometrically so the press characteristic is established purely as a function of position in the press, that is of displacement

DESCRIPTION OF THE DRAWING

The above and other features and advantages will become more readily apparent from the following, reference being made to the accompanying drawing in which.

SPECIFIC DESCRIPTION

Figure 1:
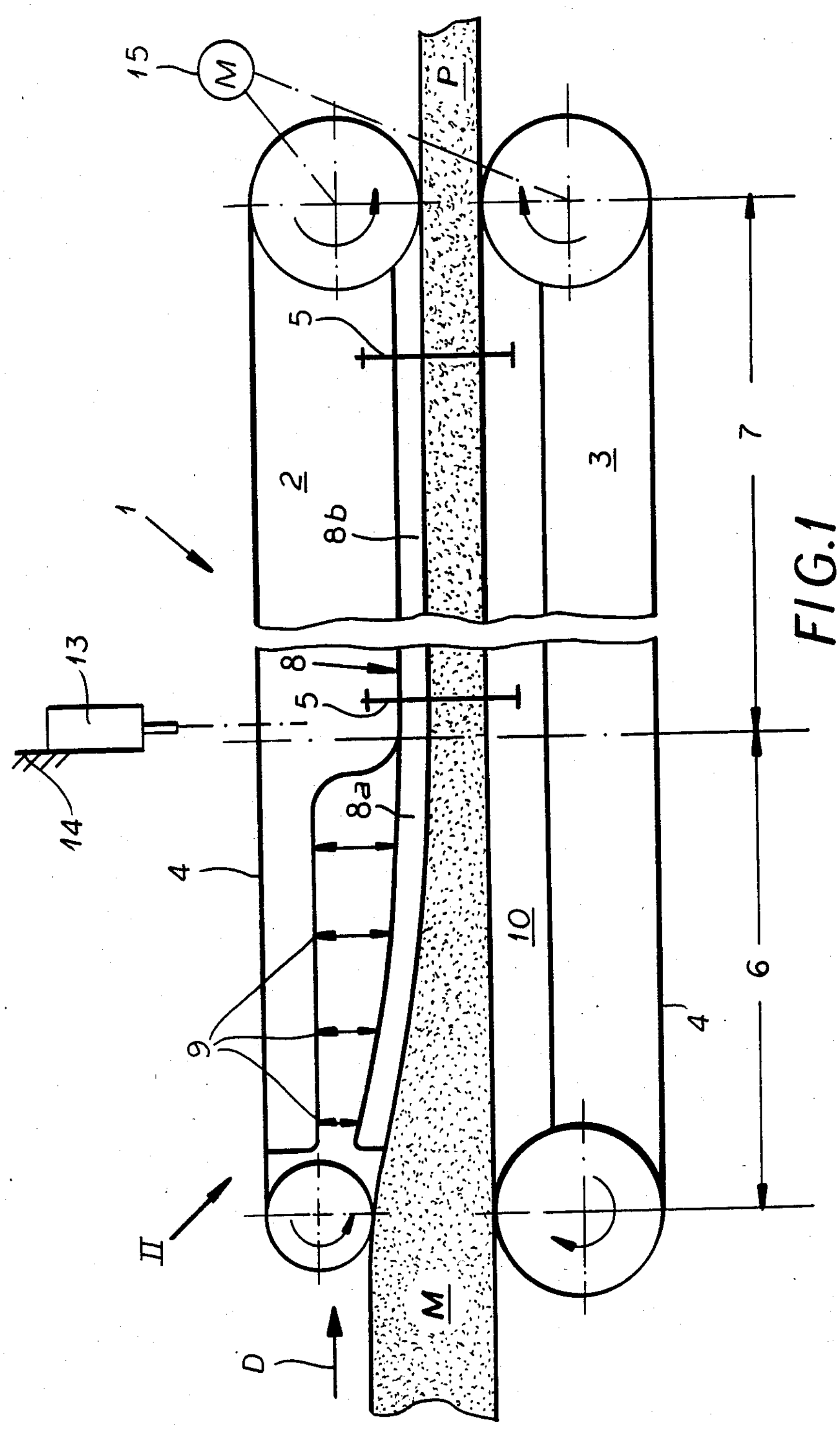
FIG. 1 is mainly diagrammatic side view illustrating the present invention.

FIG. 1 shows a press 1 for transforming a relatively thick mat M of particles into a more rigid panel P thereof. The press 1 basically comprises an upper beam or press unit 2 and a lower beam or press unit 3 respectively carrying upper and lower press platens 8 and 10, which, as known, are heated. Upper and lower endless belts 4 are spanned over these platen/beam units and are synchronously driven by a motor 15 to pull the mat M into the upstream (left-hand in FIG. 1) end of the press 1. The belts 4 are usually of steel and typically ride on the respective platens 8 and 10 via rollers, mats, or the like.

Actuators illustrated schematically at 14 are braced between one of the beams, here the upper beam 2, and a frame illustrated diagrammatically at 14 to urge the beam 2 down toward the beam 3 with a predetermined relatively large force. As described in U.S. Pat. No. 4,468,188 a series of individual actuators pressurized at the same level but spaced to give the desired pressure in a given area can also be used.

The press 1 is divided into an upstream compression zone 6 and a downstream calibration zone 7. In the calibration zone 6 the mat M is compressed from a relative great starting thickness to a relatively small finishing thickness while it is heated and the resin is plastified. During the initial compression the workpiece mat M resists the compression with considerable force, but once the normally thermosetting resin binder is activated, that is plastified, the thus compressed mat need merely be held at the desired thickness while the binder cures to produce the rigid semifinished panel P.

Figure 2:
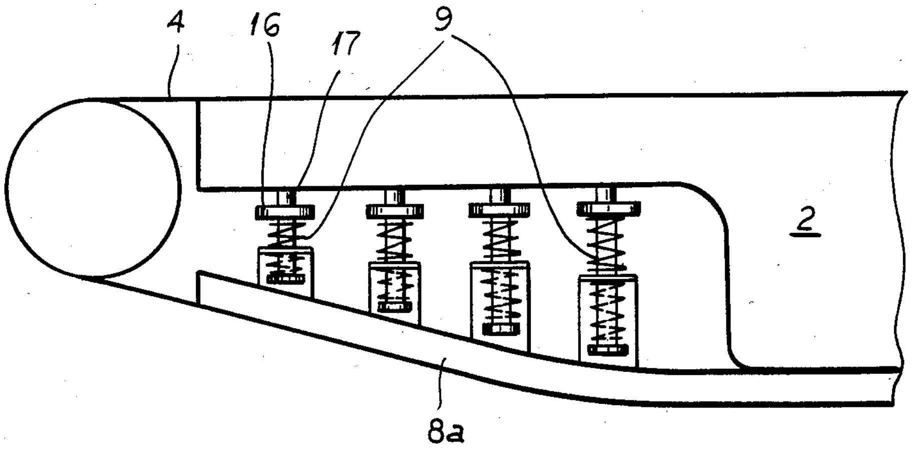
FIG. 2 is a large-scale view of a detail of FIG. 1 indicated by arrow II.
Figure 3:
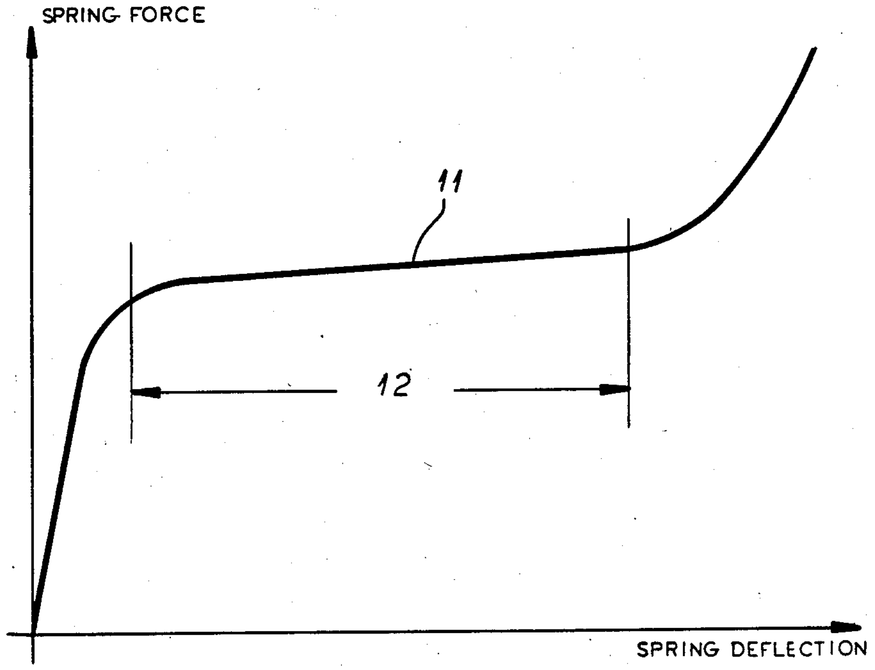
FIG. 3 is the pressure/displacement diagram for the press according to the invention.

In order to compensate for thickness and density variations, the upper platen 8 of this invention has an upstream portion 8a that stands free of the beam or support 2 and a downstream portion 8b that sits solidly and nondisplaceably on the beam 2, like the platen 10 on the beam 3. Springs 9 carried as shown in FIG. 2 on threaded spindles 17 and braced against nuts 16 threaded on these spindles 17 urge this calibration portion 8a downward with a fairly constant spring force illustrated in FIG. 3. The curve 11 of this spring force has a fairly level region 12 which corresponds to the range of deflection the portion 8a will be subjected to by mats within the normal range.

Thus with the system of this invention the mat M will be compressed with a fairly uniform force in the zone 6, and then its exact size will be set in the zone 7, as determined by the spacers 5. The result is a nearly perfect workpiece even though, surprisingly, the actual thickness of the workpiece is not established until the calibration zone 7.

I claim:

1. A method of converting a thick mat into a thin panel in a particleboard press having:

a frame;

an upper beam and a lower beam carried on the frame and vertically confronting one another, one of the beams vertically displaceable on the frame relative to the other beam;

upper and lower platens carried on the beams and vertically confronting each other, the platen of the one beam having relative to a horizontal transport direction a downstream calibration portion and an upstream compression portion at least limitedly vertically displaceable relative to the one beam and to the downstream calibration portion;

upper and lower belts having stretches engaged under and over the upper and lower platens, respectively; and spacers vertically engageable between the platens in the calibration portion; the method comprising the steps of:

synchronously diriving the belts relative to the platens and beams and thereby advancing a mat in the transport direction through the press between the platens;

urging the calibration portion with a great force toward the other platen to clamp the spacers between the platens and thereby move the calibration portion into a calibration position spaced a predetermined vertical distance from the other platen; and urging the compression portion with a predetermined generally constant and small force toward the other platen while permitting deflection ofthe compression portion of the one platen away from the other platen against the constant force and without substantial change of the constant force, the small force normally being insufficient to move the compression portion closer to the other platen than the calibration portion.

2. The method defined in claim 1 wherein the mat includes a heat-activatable binder, the method further comprising the step of heating the mat between the platens and thereby softening it and activating its binder.

3. A particleboard press for converting a thick mat into a thin panel, the press comprising:

a frame;

an upper beam and a lower beam carried on the frame and vertically confronting one another, one of the beams being vertically displaceable onthe frame relative to the other beam;

upper and lower platens carried on the beams and vertically confronting each other;

upper and lower belts having stretches engaged under and over the upper and lower platens, respectively;

means for synchronously driving the belts relative to the platens and beams and thereby advancing a mat in a transport direction through the press between the platens, the platen of the one beam having relative to the direction a downstream calibration portion and an upstream compression portion at least limitedly vertically displaceable relative to the one beam and to the downstream calibration portion;

means including spacers between the platens in the calibration portion of the one beam for urging the calibration portion into a calibration position spaced a predetermined vertical distance from the platen of the other beam with the spacers vertically engaged between the platens at the downstream calibration portion; and means including springs braced between the compression portion and the one beam and urging the compression portion with a predetermined generally constant force toward the other platen while permitting deflection of the compression portion of the one platen away from the other platen against the constant force and without substantial change of the constant force.

4. The particleboard press defined in claim 1 wherein the one platen is unitary in both the calibration and compression zone and is elastically deformable relative to the respective beam at least in the compression zone.

5. The particleboard press defined in claim 3, further comprising means for adjusting the force exerted by the springs between the compression portion of the one platen and the respective beam.

6. The particleboard press defined in claim 3 wherein the elasticity of the one platen itself constitutes the means urging the compression portion of the one platen toward the other platen.

* * * * *